(12) United States Patent
Iesiev et al.

(10) Patent No.: US 9,703,845 B2
(45) Date of Patent: Jul. 11, 2017

(54) REPRESENTING IDENTITY DATA RELATIONSHIPS USING GRAPHS

(71) Applicant: International Business Machines Corporation, Armonk, NY (US)

(72) Inventors: Andrii Sergeevich Iesiev, Florence, MA (US); Russell Lawrence Couturier, Worcester, MA (US); Shawn Richard Delton, West Springfield, MA (US); Darshan Gencarelle, Northampton, MA (US)

(73) Assignee: International Business Machines Corporation, Armonk, NY (US)

( * ) Notice: Subject to any disclaimer, the term of this patent is extended or adjusted under 35 U.S.C. 154(b) by 347 days.

(21) Appl. No.: 14/604,783

(22) Filed: Jan. 26, 2015

(65) Prior Publication Data

US 2016/0217187 A1    Jul. 28, 2016

(51) Int. Cl.
*G06F 17/30*  (2006.01)
*H04L 29/06*  (2006.01)

(52) U.S. Cl.
CPC .. *G06F 17/30554* (2013.01); *G06F 17/30595* (2013.01); *H04L 63/1408* (2013.01)

(58) Field of Classification Search
None
See application file for complete search history.

(56) References Cited

U.S. PATENT DOCUMENTS

| | | | |
|---|---|---|---|
| 7,219,239 B1 | 5/2007 | Njemanze | |
| 8,036,907 B2 * | 10/2011 | Davies | G06F 17/3051 703/2 |
| 8,434,150 B2 | 4/2013 | Xie et al. | |
| 8,473,489 B1 * | 6/2013 | Lasko | G06F 17/3097 707/726 |
| 8,732,167 B1 * | 5/2014 | Srinivasaiah | G06F 17/30241 707/730 |

(Continued)

FOREIGN PATENT DOCUMENTS

WO    2014171926    10/2014

OTHER PUBLICATIONS

European Search Report, European Application No. EP 16 15 1512, May 20, 2016.

*Primary Examiner* — Hung Le
(74) *Attorney, Agent, or Firm* — Jeffrey S. LaBaw; David H. Judson

(57) ABSTRACT

Identity data collected from network flows is managed and graphed according to a hierarchical schema that reduces data storage requirements and enhance database querying efficiencies. Preferably, the schema comprises a set of objects, such as a "source" object, a "time" object, and an "identity" object. A source object represents a source of an identity, namely, where an identity comes from. A time object represents a time bucket along a particular time frame corresponding to when an identity appears on the network. An identity object represents the actual identity itself. As each distinctive identity data is detected, it is added to the graph, preferably just once, and relationships between particular pairs of identities are identified. The resulting graph has significantly-reduced storage requirements, and it facilitates the discovery of linked identities much more efficiently, even when the identities are not directly connected.

21 Claims, 8 Drawing Sheets

(56) References Cited

U.S. PATENT DOCUMENTS

| | | | | |
|---|---|---|---|---|
| 8,739,016 B1* | 5/2014 | Goldman | G06Q 50/01 | 715/200 |
| 9,116,982 B1* | 8/2015 | Stern | G06F 17/30707 | |
| 2005/0149527 A1* | 7/2005 | Berlin | G06Q 90/00 | |
| 2006/0239200 A1* | 10/2006 | Pirzada | H04L 67/24 | 370/252 |
| 2008/0028000 A1* | 1/2008 | Makismenka | G06F 17/30038 | |
| 2008/0070209 A1* | 3/2008 | Zhuang | G06Q 10/10 | 434/236 |
| 2009/0150212 A1* | 6/2009 | Steuben | G06Q 10/063 | 705/7.11 |
| 2009/0177669 A1* | 7/2009 | Ramarao | G06F 17/2247 | |
| 2011/0231382 A1* | 9/2011 | Xu | G06F 17/278 | 707/706 |
| 2011/0258200 A1* | 10/2011 | Drummond | G06Q 50/01 | 707/748 |
| 2012/0109942 A1* | 5/2012 | Epshtein | G06F 17/30241 | 707/723 |
| 2012/0124202 A1* | 5/2012 | Cooper | G06F 17/30035 | 709/224 |
| 2013/0218354 A1 | 8/2013 | San Andres et al. | | |
| 2013/0218797 A1* | 8/2013 | Prichard | G06Q 30/0204 | 705/325 |
| 2013/0237202 A1* | 9/2013 | Tokgoz | H04W 28/0289 | 455/418 |
| 2014/0115155 A1 | 4/2014 | Bonchi et al. | | |
| 2014/0330937 A1* | 11/2014 | O'Shea | H04L 65/4069 | 709/219 |
| 2014/0365495 A1* | 12/2014 | Legarda | H04L 51/046 | 707/740 |
| 2015/0095368 A1* | 4/2015 | Koppes | G06F 17/30424 | 707/769 |
| 2015/0195242 A1* | 7/2015 | Robinson | G06Q 10/10 | 709/206 |
| 2015/0286723 A1* | 10/2015 | Sun | G06F 17/3053 | 707/706 |
| 2016/0352735 A1* | 12/2016 | Zou | H04L 63/10 | |

* cited by examiner

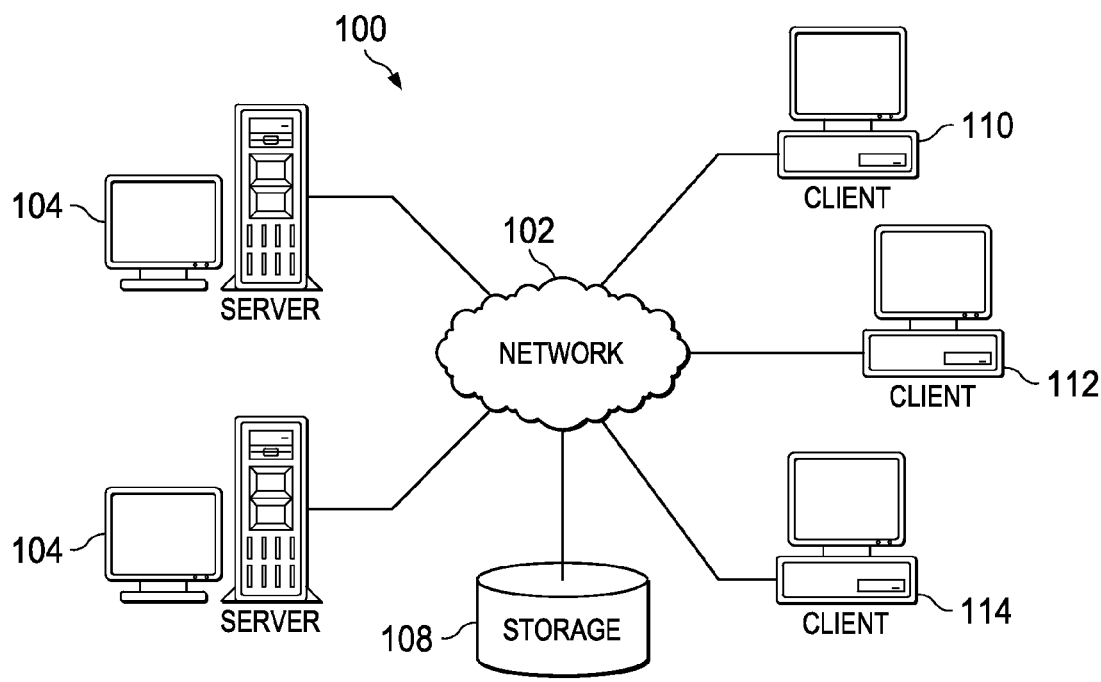
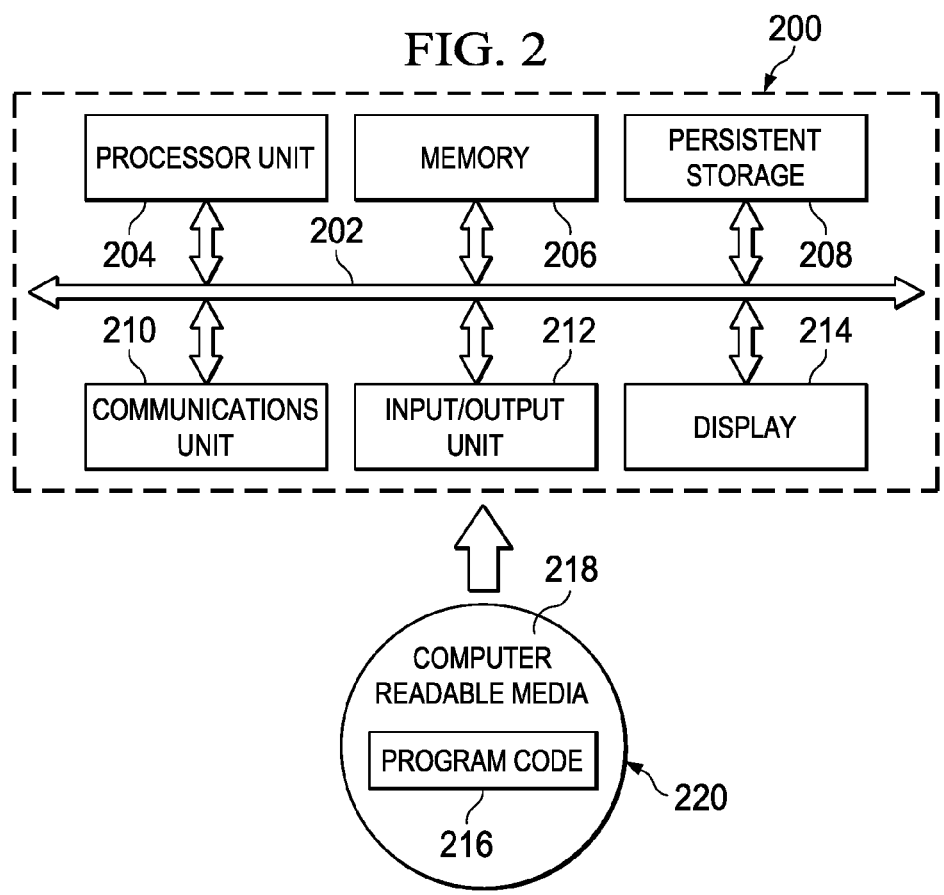

900

From: John Doe <john.doe@mail.com>
To: ann.white@aol.com
Subject: Confirmation
Date: 10th of January, 2015
Body:
Hi Ann,
Are we still ok to meet tomorrow?

John Doe
Senior Manager at BigSales
Phone 555:123:4567
Skype: john.bigsales

REPRESENTING IDENTITY DATA RELATIONSHIPS USING GRAPHS

BACKGROUND OF THE INVENTION

Technical Field

This disclosure relates generally to information security on network-connected appliances.

Background of the Related Art

Today's networks are larger and more complex than ever before, and protecting them against malicious activity is a never-ending task. Organizations seeking to safeguard their intellectual property, protect their customer identities, avoid business disruptions, and the like, need to do more than just monitor logs and network flow data; indeed, many organizations create millions—or even billions—of events per day, and distilling that data down to a short list of priority offenses can be daunting. To address this problem, so-called Security Information and Event Management (SIEM) systems and methods have been developed to collect, normalize and correlate available network data. One such security intelligence product of this type is IBM® QRadar SIEM, which provides a set of platform technologies that automatically discover network log source devices and inspects network flow data to find and classify valid hosts and servers (assets) on the network, tracking the applications, protocols, services and ports they use. The product collects, stores and analyzes this data, and it performs real-time event correlation for use in threat detection and compliance reporting and auditing. Using this platform, billions of events and flows can therefore be reduced and prioritized into a handful of actionable offenses, according to their business impact.

Systems such as described above have the capability of providing forensic analysis of user "identity" data captured from the network flow data. Identity information represents an identification of a person and his or her activity on the network. On-line identifiers, such as email addresses, Skype addresses, MAC addresses, chat IDs, social media IDs, or Twitter IDs, and many others, are used to identify entities or people. In a platform such as described, known entities or persons that are found in the network traffic and documents are automatically tagged, and such data can then be exposed to forensics analysis when the platform is used to investigate an incident. With this known approach, however, the same identity may appear in the network flow data multiple times and originate from many different sources. These multiple appearances typically are represented as a frequency distribution. From a data storage perspective, the frequency distribution data typically is stored in a relational database. A database storage schema of this type, however, makes it difficult for the system to relate disparate relationships, i.e. those not directly-connected to one another, in terms of the relational data. Accordingly, and because each appearance of the same identity in the network flow may require its own data record in the database, the data storage requirements for managing large data sets can become burdensome. Further, such a database schema does not easily relate disparate relationships, especially for identities that have large relation level differences.

Thus, there is a need to provide a new paradigm for managing identity data of the type collected by security intelligence technologies to provide for better data storage and management, and to provide for more efficient analysis and presentation of that data.

BRIEF SUMMARY

A database schema and associated graphing method are provided to facilitate the enhanced and more efficient management of identity data for security intelligence.

According to this disclosure, identity data collected from network flows is managed and graphed according to a hierarchical schema. Preferably, the schema comprises a set of objects, such as a "source" object, a "time" object, and an "identity" object. A source object represents a source of an identity, namely, where an identity comes from. A time object represents a time bucket (along a particular time frame) corresponding to when an identity appears on the network. There may be multiple time objects representing a time frame of interest. An identity object represents the actual identity itself.

A graphical representation comprising a set of vertices, and a set of edges, is then created from the object data in the above-described schema. The graph typically is hierarchical in structure, and it includes a top level, an intermediate level, and a bottom or lower level. At the top level, a vertex (a source object) is created for each new source of identity. At an intermediate level, time objects (representing time buckets along the time frame) and that will contain (by association) at least one identity are created if they do not exist yet in the graph. At a bottom level of the graph, a vertex (an identity object) is created for each identity if it does not exist yet in the graph. Edges are added to the graph to define the association among the source objects, the time objects, and the identity objects. These edges include at least one new edge, which is added to represent a relationship between identities, if such an edge does not yet exist in the graph. In this manner, each distinctive identity and relationship between particular pairs of identities is added to the graph only once, with the resulting graph having significantly-reduced storage requirements as compared to the prior art techniques for managing relationship data of this type and form. The hierarchical schema and graphical approach to representing identity data also enables the system to discovery linked identities much more efficiently, even when the identities are not directly connected.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which:

FIG. 1 depicts an exemplary block diagram of a distributed data processing environment in which exemplary aspects of the illustrative embodiments may be implemented;

FIG. 2 is an exemplary block diagram of a data processing system in which exemplary aspects of the illustrative embodiments may be implemented;

DETAILED DESCRIPTION OF AN ILLUSTRATIVE EMBODIMENT

Figure 3:
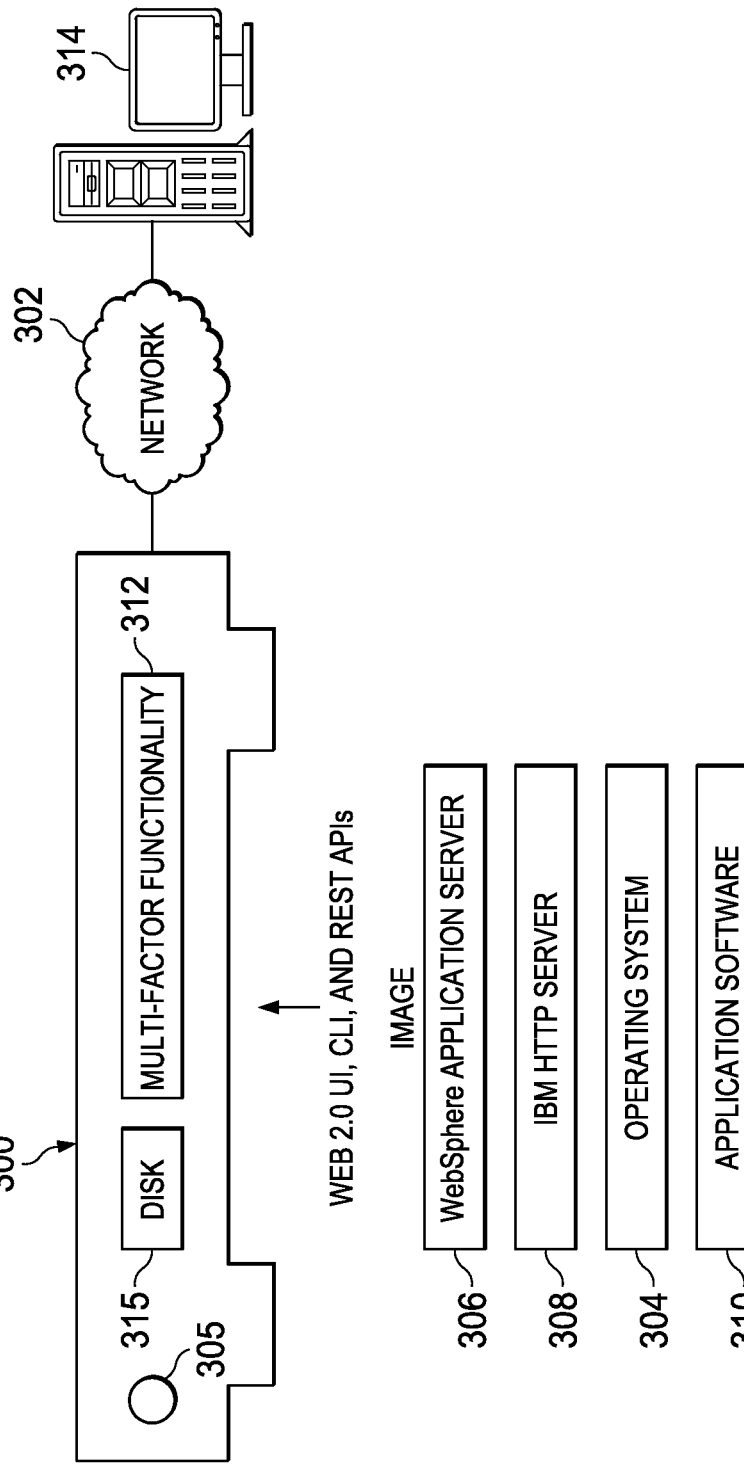
FIG. 3 illustrates an exemplary network-based secure appliance in which the disclosed subject matter may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.
Client-Server Technologies With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Network-Connected Secure Appliances

Network-connected, non-display devices ("appliances") are ubiquitous in many computing environments. For example, appliances built purposely for performing traditional middleware service oriented architecture (SOA) functions are prevalent across certain computer environments. SOA middleware appliances may simplify, help secure or accelerate XML and Web services deployments while extending an existing SOA infrastructure across an enterprise. The utilization of middleware-purposed hardware and a lightweight middleware stack can address the performance burden experienced by conventional software solutions. In addition, the appliance form-factor provides a secure, consumable packaging for implementing middleware SOA functions. One particular advantage that these types of devices provide is to offload processing from back-end systems. To this end, it is well-known to use such middleware devices to perform computationally-expensive processes related to network security. For example, network intrusion prevention system (IPS) appliances are designed to sit at the entry points to an enterprise network to protect business-critical assets, such as internal networks, servers, endpoints and applications, from malicious threats.

A network appliance typically is a rack-mounted device. The device includes physical security that enables the appliance to serve as a secure vault for sensitive information. Typically, the appliance is manufactured, pre-loaded with software, and then deployed within or in association with an enterprise or other network operating environment; alternatively, the box may be positioned locally and then provisioned with standard or customized middleware virtual images that can be securely deployed and managed, e.g., within a private or an on premise cloud computing environment. The appliance may include hardware and firmware cryptographic support, possibly to encrypt data on hard disk. No users, including administrative users, can access any data on physical disk. In particular, preferably the operating system (e.g., Linux) locks down the root account and does not provide a command shell, and the user does not have file system access. Typically, the appliance does not include a display device, a CD or other optical drive, or any USB, Firewire or other ports to enable devices to be connected thereto. It is designed to be a sealed and secure environment with limited accessibility and then only be authenticated and authorized individuals.

Referring to FIG. 3, a representative operating environment includes the physical appliance 300, which interfaces to a network 302. The appliance may be implemented using a data processing system such as described above with respect to FIG. 2, and it may represent one of the servers (or clients) shown in FIG. 1. Typically, the appliance 300 includes a Web 2.0-based user interface (UI), a command line interface (CLI), and REST-based application programming interfaces (APIs). In this example, the appliance has been provisioned with an image comprising an operating system 304, an application server 306, an HTTP server 308, and other application programs 310. Additional software solutions (not shown) may be included within the image. These software elements may come pre-loaded on the appliance, which may include other data (e.g., templates, scripts, files, etc.). The particular software configuration of course will depend on the use being made of the appliance. The appliance includes one of more storage devices (e.g., disk 315). The type and number of storage devices may vary.

An appliance of this type can facilitate Security Information Event Management (SIEM). For example, IBM QRadar SIEM is an enterprise solution that includes packet data capture appliances that may be configured as shown in FIG. 3 and as described above. Such a device is operative, for example, to capture real-time Layer 4 network flow data from which Layer 7 application payloads may then be analyzed, e.g., using deep packet inspection and other technologies.

Security Intelligence Platform with Incident Forensics

Figure 4:
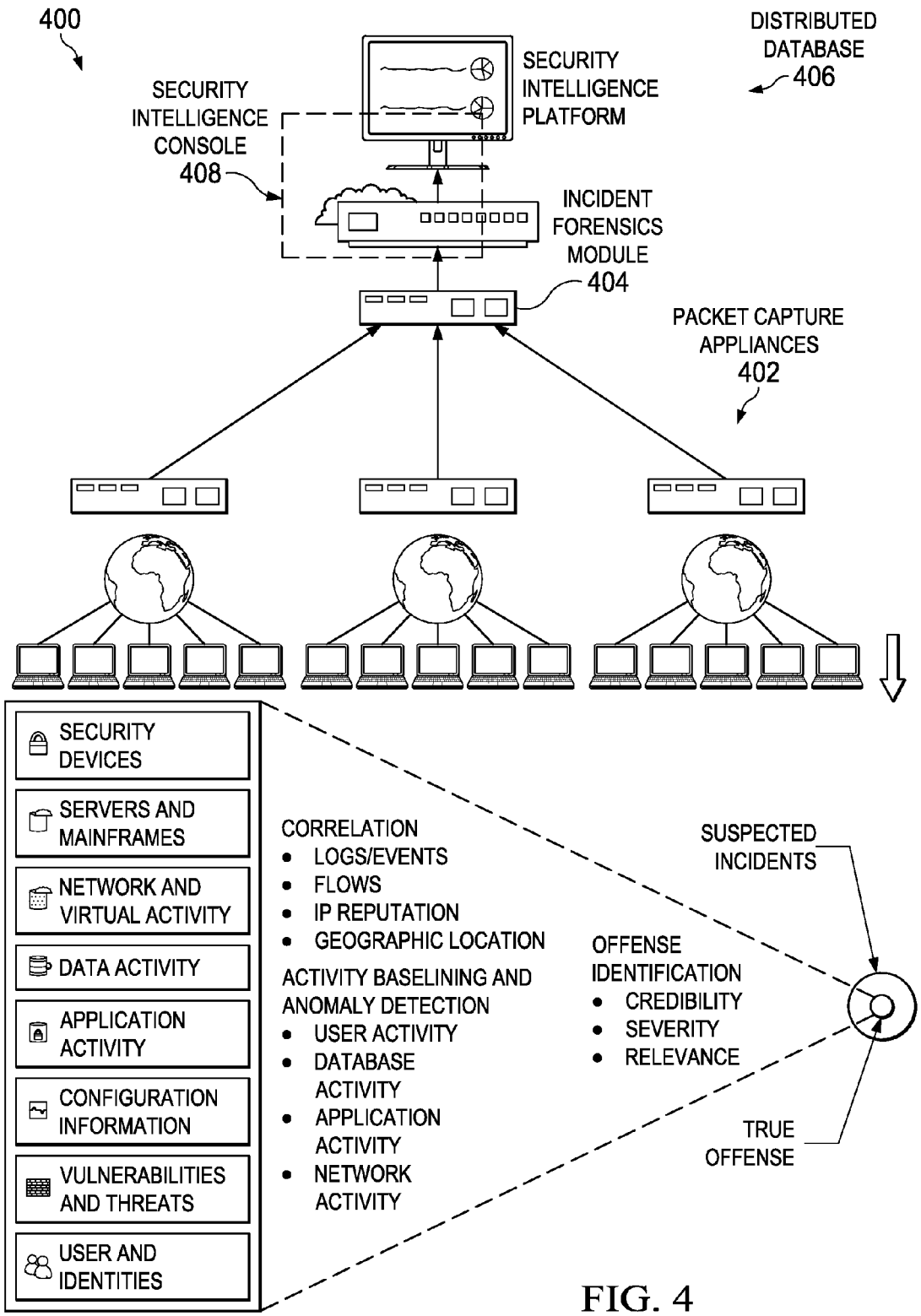
FIG. 4 illustrates a security intelligence platform in which the techniques of this disclosure may be practiced.

A representative security intelligence platform in which the techniques of this disclosure may be practiced is illustrated in FIG. 4. Generally, the platform provides search-driven data exploration, session reconstruction, and forensics intelligence to assist security incident investigations. In pertinent part, the platform 400 comprises a set of packet capture appliances 402, an incident forensics module appliance 404, a distributed database 406, and a security intelligence console 408. The packet capture and module appliances are configured as network appliances, such as illustrated in FIG. 3 and described above, or they may be configured as virtual appliances. The packet capture appliances 402 are operative to capture packets off the network (using known packet capture (pcap) application programming interfaces (APIs) or other known techniques), and to provide such data (e.g., real-time log event and network flow) to the distributed database 406, where the data is stored and available for analysis by the forensics module 404 and the security intelligence console 408. A packet capture appliance operates in a session-oriented manner, capturing all packets in a flow, and indexing metadata and payloads to enable fast search-driven data exploration. The database 406 provides a forensics repository, which distributed and heterogeneous data sets comprising the information collected by the packet capture appliances. The console 408 provides a web- or cloud-accessible user interface (UI) that exposes a "Forensics" dashboard tab to facilitate an incident investigation workflow by an investigator. Using the dashboard, an investigator selects a security incident. The incident forensics module 404 retrieves all the packets (including metadata, payloads, etc.) for a selected security incident and reconstructs the session for analysis. A representative commercial product that implements an incident investigation workflow of this type is IBM® Security QRadar® Incident Forensics V7.2.3 (or higher). Using this platform, an investigator searches across the distributed and heterogeneous data sets stored in the database, and receives a unified search results list. The search results may be merged in a grid, and they can be visualized in a "digital impression" tool so that the user can explore relationships between identities.

In particular, a typical incident forensics investigation to extract relevant data from network traffic and documents in the forensic repository is now described. According to this approach, the platform enables a simple, high-level approach of searching and bookmarking many records at first, and then enables the investigator to focus on the bookmarked records to identify a final set of records. In a typical workflow, an investigator determines which material is relevant. He or she then uses that material to prove a hypothesis or "case" to develop new leads that can be followed up by using other methods in an existing case. Typically, the investigator focuses his or her investigation through course-grained actions at first, and then proceeds to fine-tune those findings into a relevant final result set. The bottom portion of FIG. 4 illustrates this basic workflow. Visualization and analysis tools in the platform may then be used to manually and automatically assess the results for relevance. The relevant records can be printed, exported, or submitted processing.

As noted above, the platform console provides a user interface to facilitate this workflow. Thus, for example, the platform provides a search results page as a default page on a Forensics interface display tab. Search results are available on a Grid tab. Investigators use the search results on the grid to quickly search for and access documents. On the Grid tab, the investigator can use other tools to further the investigation. One of these tools is a Digital Impression tool. A digital impression is a compiled set of associations and relationships that identify an identity trail. Digital impressions reconstruct network relationships to help reveal the identity of an attacking entity, how it communicates, and what it communicates with. The digital impressions tool may be used to quickly answer questions such as: what is known about this suspected attacker, computer, or IP address? Who has this suspected attacker talked to? Who is in their network of contacts? Is the suspected attacker trying to disguise their identity? In this approach, on-line identifiers, such as email addresses, Skype addresses, MAC addresses, chat IDs, social media IDs, or Twitter IDs, and many others, are used to identify entities or people. Known entities or persons that are found in the network traffic and documents are automatically tagged. The forensics incident module is operative to correlate tagged identifiers that interacted with each other to produce a digital impression. The collection relationships in a digital impression report represent a continuously-collected electronic presence that is associated with an attacker, or a network-related entity, or any digital impression metadata term. Using the tool, investigators can click any tagged digital impression identifier that is associated with a document. The resulting digital impression report is then listed in tabular format and is organized by identifier type.

In one particular approach, a digital impression report shows the interactions between a centering identifier and all other identifiers. A centering identifier is the on-line identifier that is source of interest in a security incident. The top most identifier in many categories is usually the identity of the centering identifier in that identifier type or category. For example, if the identifier is a MAC address, the email address that has the most interactions likely belongs to the suspected attacker who owns the computer. If, however, IP addresses are assigned dynamically, the investigator may also investigate the IP addresses that are assigned over a time range. The correlations between other categories and the centering identifier are typically less strong. Before the investigator acts based on digital impressions, he or she should validate the data with independent sources. Digital impressions thus may be used to expand the radius of an investigation to more suspected attackers and entities.

Generalizing, a digital impression reconstructs network relationships to help the investigator identify an attacking entity and other entities that it communicates with. A security intelligence platform includes a forensics incident module that is operative to correlate tagged identifiers that interacted with each other to produce a digital impression. The collection relationships in a digital impression report represent a continuously-collected electronic presence that is associated with an attacker, or a network-related entity, or any digital impression metadata term. Using the tool, investigators can click any tagged digital impression identifier that is associated with a document. The resulting digital impression report is then listed in tabular format and is organized by identifier type.

Using Graphs to Identify User Identity Attribute Relationships

As noted above, the technique herein is an identity database schema and associated graphing method, which together facilitate the enhanced and more efficient management of identity data for security intelligence.

Figure 5:
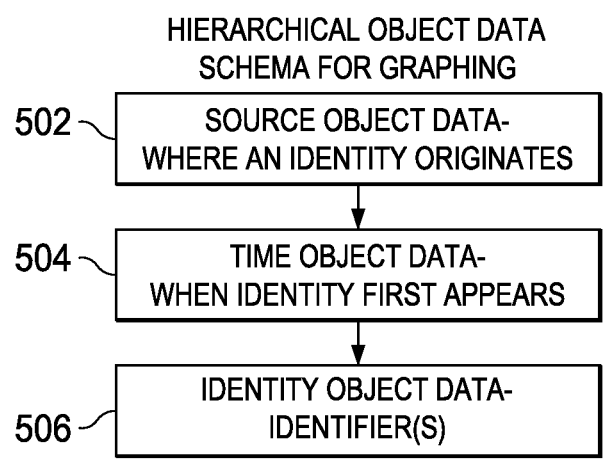
FIG. 5 depicts a hierarchical data object schema that may be implemented according to this disclosure

FIG. 5 represents the basic data objects of the schema 500. These objects preferably comprise a "source" object 502, a "time" object 504, and an "identity" object 506. The particular nomenclature used is not intended to be limited. The notion of "object" as used here likewise is not intended to be limiting, and it typically refers to a piece of data or a data item corresponding to the particular "source," "time" or "identity" as the case may be. Generally, the source object 502 represents a source of an identity, namely, where an identity comes from. The source information is obtained by the packet capture appliance, and its particular value or name depends on the nature and type of network flow. The time object 504 represents temporal data, typically a time bucket (along a particular time frame) corresponding to when an identity appears on the network (i.e., in the network flow). The time frame may any arbitrary time period (e.g., a particular day, a particular time period within a day, or the like), preferably as measured from a particular start time (e.g., an epoch). There may be multiple time objects (buckets) representing a time frame of interest. For example, if there is only one piece of identity data captured from the network flow for a particular hour of the day, there is just one time object for that hour; on the other hand, if a first piece of identity data is captured from the network flow during the first 30 minutes of the hour, and then a second piece of identity data is captured from the flow during the next 30 minutes, there will be two time objects created, one representing the first 30 minutes of the hour, and the second representing the second 30 minutes of the hour, and so forth. The identity object 506 represents the actual identity itself. These include any types of on-line identifiers, such as email addresses, IP addresses, phone numbers, credit card numbers, Social Security numbers, zip codes, Skype addresses, MAC addresses, security certificate, personal information or attributes, chat IDs, social media IDs, Twitter IDs, and many others, are used to identify entities or people.

Figure 6:
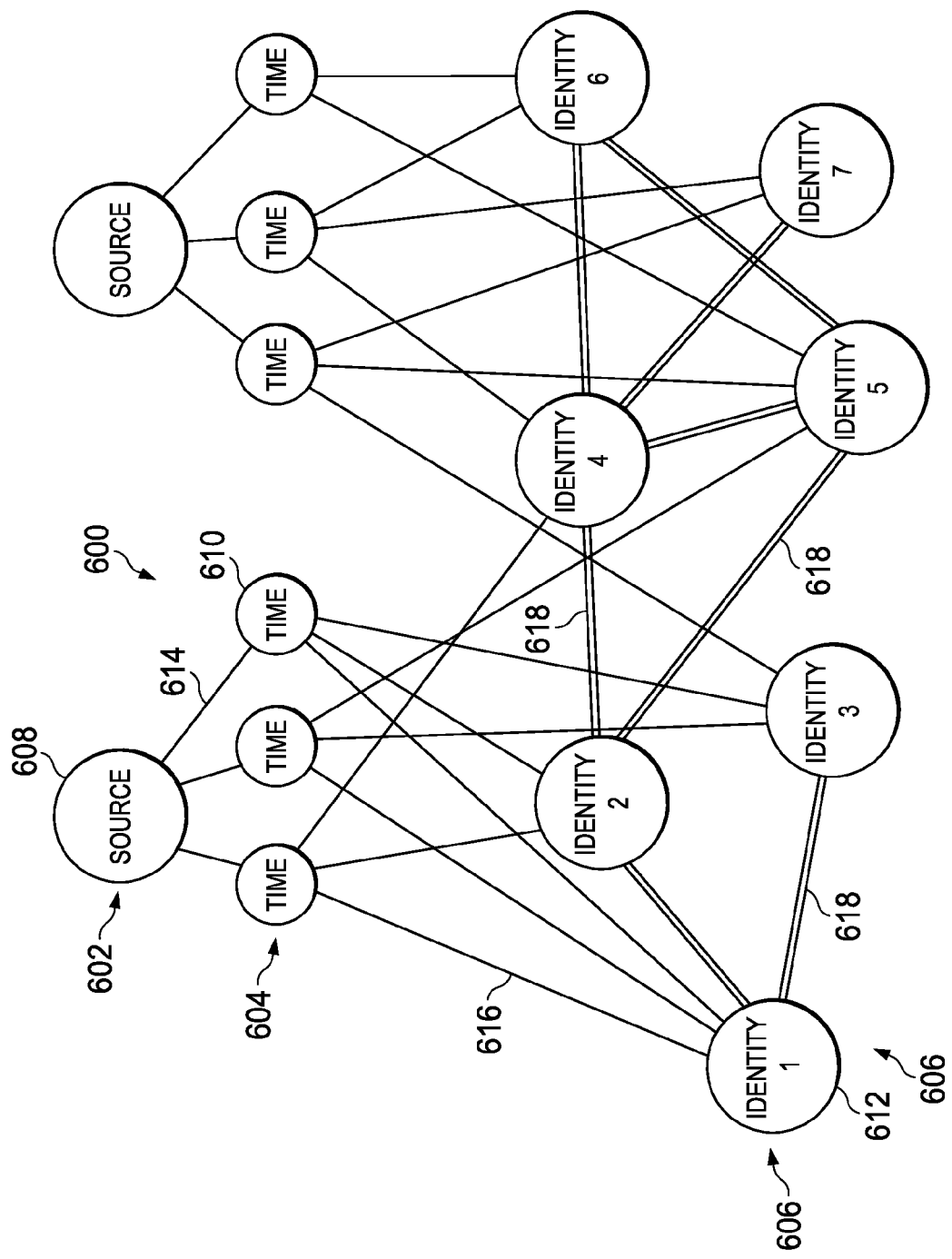
FIG. 6 depicts how source-time-identity data may be represented as an un-directed graph according to this disclosure.

A graphical representation comprising a set of vertices, and a set of edges, is then created from the object data in the above-described schema. FIG. 6 depicts an instance of the basic graph structure. As can be seen, the graph 600 typically is hierarchical in structure, and it includes a top level 602, an intermediate level 604, and a bottom or lower level 606. While the graph is represented as a two-dimensional structure, this is not a limitation either. At the top level 602, a vertex 608 (representing a source object) is created for each new source of identity. At the intermediate level 604, time objects (representing time buckets along the time frame) 610 and that are associated (contain) at least one identity are created if they do not exist yet in the graph 600. At a bottom level 606, a vertex 612 (representing an identity object) is created for each identity if it does not exist yet in the graph. Edges are added to the graph to define the association among the source objects, the time objects, and the identity objects. Thus, for example, graph 600 includes an edge 614 between a source object 606 and a time object 610, and this edge indicates that the "source" appeared on the network during the time period (or at the time) specified by the time object. Likewise, an edge 616 between a time object 610 and an identity object 612 indicates when the particular identity was captured in the network flow.

As also indicated, the graph also includes special types of edges, which are indicated as double lines 618. An edge 618 is added to the graph 600 to represent a relationship between identities. By graphing in this manner, it can be seen that each distinctive identity and relationship between particular pairs of identities is added to the graph only once, because when an identity has already been captured and added to the graph, it is not added again. In other words, the approach herein obviates creating and storing a separate data record in a database for each occurrence of the same identity in the network flow. Rather, the graph depicts identity connections and how those connections grow over a relevant time period of interest. The identity connections provide a much more robust visualization that enables linked identities to be discovered much more efficiently, even when the identities are not directly connected.

Figure 7:
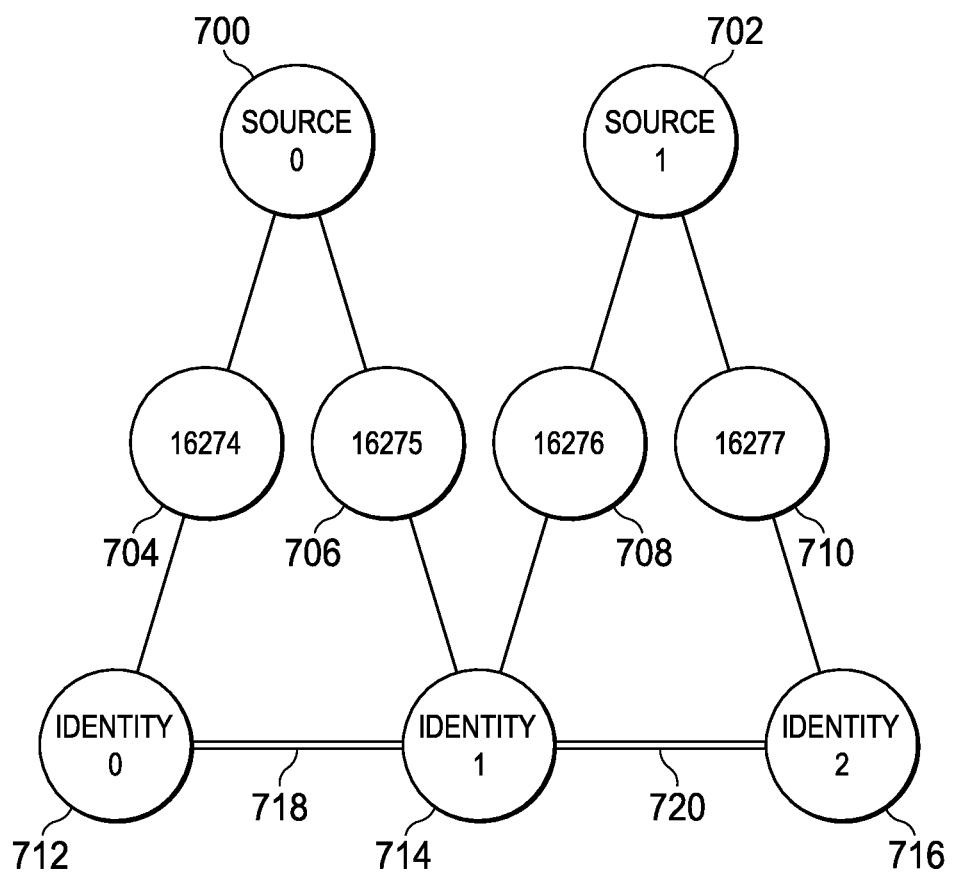
FIG. 7 illustrates a concrete instantiation of the graph in FIG. 6 for a given data set.

FIG. 7 illustrates a particular embodiment of the graph for sources 700 and 702, time buckets 704, 706, 708 and 710, and identity objects 712, 714 and 716. In this example, identity 712 was captured on the network at time bucket 16274 and originated from source 700. Another identity 714 originated from that same source 700 but was captured on the network at time bucket 16275. The identity 714 was also captured in the network flow at time bucket 16276, but in this case originated from a different source 702. Another identity 716 appeared on the network at time bucket 16277, and also originated from the source 702. The various edges in the graph depict these associations. In addition, the system shows identity 712 and 714 being connected by edge 718, which represents that the system has tagged these identities as having a relationship, in this case the fact that the two identities originate from the same source 700 but were seen in the network flow at different times. Likewise, the system has tagged identities 714 and 716 as having a relationship, which is represented by edge 720, in this case the fact that the two identities originate from the same source 702 but were seen in the network flow at different times.

The nature of the relationship indicated by the identity connections may be of any type. The technique of this disclosure accumulates the identity data and the relationships (connections) among that data. The graph provides a tool by which attack traces (in network traffic) can be identified, e.g., by the forensic analysis. Indeed, and as can be seen, with source-time-identity data depicted in this manner, any two or more disparate identities can be selected, whereupon the edges (as depicted) between or among them (whether direct or indirect) then can be considered to represent the connections between (or among them). Thus, the graph enables discovery of connections (related links) between and among identities that may not be otherwise apparent. For example, assume that a security incident is detected as originating at a MAC address for a device (a first identity), although the identity of the user is not ascertainable. By analyzing how that identity is linked to one or more identities (as represented by the bottom edges in the graph), the system may be able to ascertain the real person behind the attack or identify other relevant attack vector information.

Generalizing, a connection between or among a set of identities may then comprise a digital impression (a compiled set of associations and relationships) that identify an identity trail. As noted above, digital impressions reconstruct network relationships to help reveal the identity of, for example, an attacking entity, how it communicates, and what it communicates with.

Figures 8, 9:
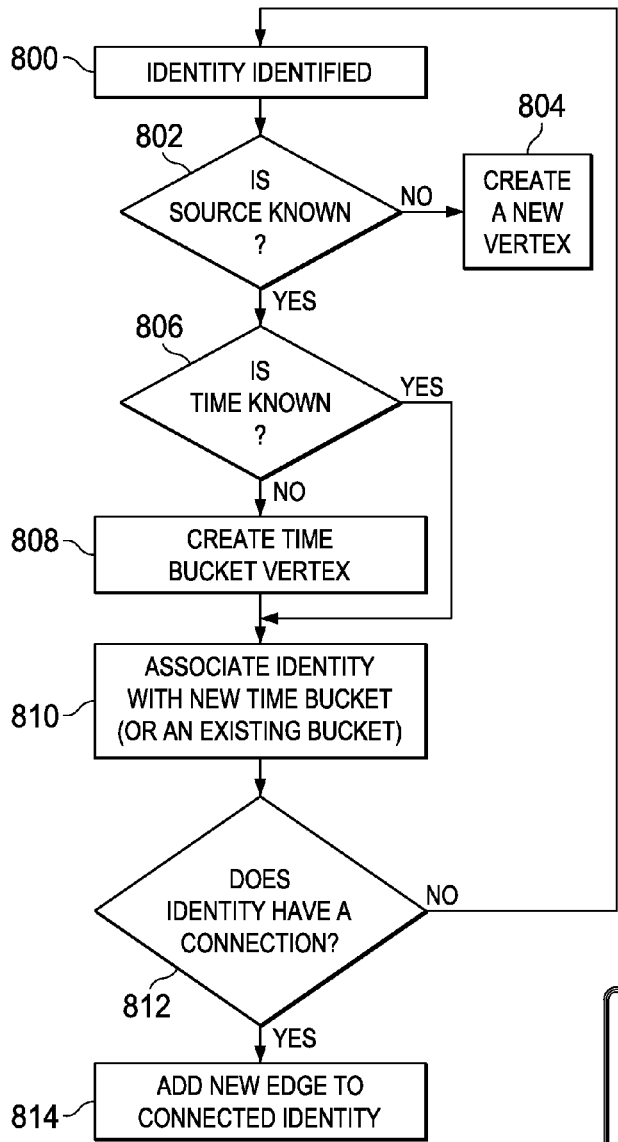
FIG. 8 depicts a process flow for generating the graph upon detection of an identity from the network flow according to this disclosure.
FIG. 9 depicts a sample network message that includes a set of identities.

FIG. 8 illustrates a process flow for a graphing method that may be used to generate a source-time-identity graph such as described above. This process may be implemented in one or more computer programs (computer program instructions) executed in one or more hardware processors. The routine begins at step 800 with discovery (from a given "source" and at a given "time") of the identity. At step 802, a test is performed to determine whether a source for the identity is new (i.e., whether a vertex already exists for the source in the source level of the hierarchy). If so, the routine continues at step 804 to create a new vertex corresponding to the new source. If, however, the source already exists, the routine continues. At step 806, a test is performed to determine whether a time at which the identity appeared on the network is already represented in the graph. If not, the routine continues at step 808 to create a new time bucket vertex corresponding to the time at which the identity appeared on the network and to associate (via an edge) that bucket to the source. If, however, the time bucket already exists, the routine continues. At step 810, the identity is associated (via an edge) with the new time bucket (or the existing one if it already exists). At step 812, a test is performed to determine whether the identity has a given relationship of interest with one or more other identities that are already present in the graph for the relevant time frame. If so (and that link is not already present), a new edge (a connection to the identity) is added to the graph for the relationship at step 814. Step 812 is then repeated for each relationship.

The following provides additional details regarding the techniques of this disclosure. By way of example only, assume a network flow as a flow of documents. Each document, for example, is one of an email message, a Skype message, an IRC chat message, or the like. FIG. 9 is a representative email message 900. The email message includes, for example, a sender, and a recipient, and a message body that contains a signature. As can be seen, this simple message includes five distinct identities: name (John Doe), e-mail (john.doe@mail.com), e-mail (ann.white@aol.com), phone (555.123.4567) and Skype (john.bogsales). The fact that all of these identities are in this documents tells the forensics module that they are connected to one another. Accordingly, when building the graph, the forensics module adds five vertices and ten edges that connect all these identities to one another. Also, the forensics module connects all of the vertices to a time bucket that represents the data, in this case "10 Jan. 2015."

Figure 10:
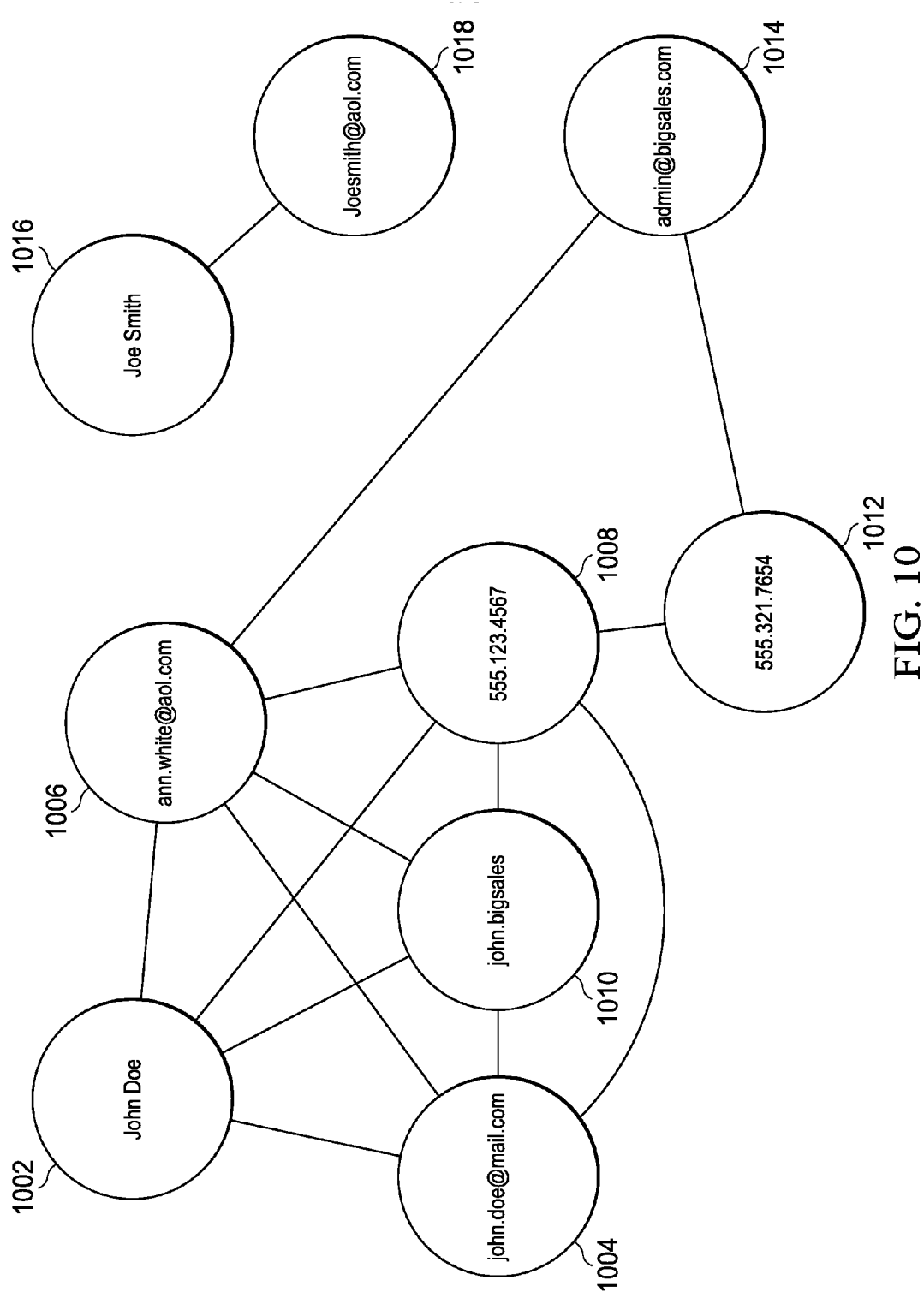
FIG. 10 depicts a portion of a graph instance that includes identity-related information obtained in part from the sample network message in FIG. 9.

FIG. 10 illustrates a portion 1000 of the relevant graph instance. In this drawing, and for ease of illustration, only the bottom layer (namely, identity objects) are visible. As can be seen, objects 1002, 1004, 1006, 1008 and 1010 represent the five identities that were culled from the message shown in FIG. 9. Some of these identity objects also share various connections to other identity objects 1012 and 1014, but not with respect to still other identity objects 1016 and 1018.

With the graph/data representation such as shown in FIG. 10, the forensics module can then be queried to answer one or more questions, such as "Does Joe Smith know John Doe?" or "Does admin@bigsales.com relate to ann.white@aol.com?" Of course, the nature of the queries (or their semantics) is not a particular aspect of this disclosure, as any type of input mechanism may be used for this purpose. Using the graph, the forensics module can determine that the answer to the first query is no, because there is no path between the identity vertices "Joe Smith" and "John Doe." On the other hand, the answer to the second query is yes, because there are two possible paths: (1) admin@bigsales.com→ann.white@aol.com, and (2) admin@bigsales.com→555.321.7654→555.123.4567→ann.white@aol.com. This example illustrates how linking a particular identity in the hierarchical association with at least one other identity with which the particular identity shares a given relationship facilitates the system's ability to respond to forensic queries in a computationally-efficient, and storage-efficient manner, especially as compared to prior techniques wherein the data is stored in a relationship database.

The technique of this disclosure provides several advantages. It enables a significant reduction in the storage space required to represent the network flow data, because each distinctive identity, as well as the relationship between particular pairs of identities, need only be represented once (in the directed graph). There is no need to store a particular data record in the database for each occurrence of the identity in the network flow. As a further benefit, data storage within the database is optimized for more efficient information retrieval by the incident forensics module (or other database query tool). Using a visualization tool, the system (or user) can then readily discover linked identities that would not otherwise be discoverable using conventional techniques. The approach thus enables the forensics incident investigator to find (within a network traffic flow) traces of an attacker in a much more robust and computationally-efficient manner, thereby improving the use and operation of the fore While a preferred operating environment and use case (an incident forensics system) has been described, the techniques herein may be used in any other operating environment in which it is desired to intercept, decrypt and inspect network traffic to and/or from a computing system or device for security intelligence.

As has been described, the functionality described above may be implemented as a standalone approach, e.g., a software-based function executed by a processor, or it may be available as a service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The techniques described herein may be implemented in or in conjunction with various client-side architectures (e.g., firewalls, NAT devices), and in or in conjunction with various server-side architectures including simple n-tier architectures, web portals, federated systems, and the like. The techniques herein may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the trusted platform module function is implemented in software, which includes but is not limited to firmware, resident software, microcode, and the like. Furthermore, the download and delete interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a non-transitory computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the interfaces and utility are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

While the above-described hierarchical scheme (involving source-time-identity) is preferred, other object models may be implemented. Thus, for example, instead of the "source" variable, the system may use a "target" value. Instead of "time," the system may use a "location" value. Other schemas may be implemented, as a person skilled in forensics incident analysis would appreciate.

In one embodiment, the graph(s) may be stored in a graph-oriented database, such as Neo4j, in which case Cypher may be used as the query language to search and retrieve relevant identity relationship data from the stored graph. Another graph-oriented database that may be used is OrientDB, which implements a modified SQL as a query language. There are merely representative database systems.

The techniques herein generally provide for the above-described improvements to a technology or technical field, as well as the specific technological improvements to security intelligent platform technologies and incident forensics, such as described above.

Having described our invention, what we now claim is as follows:

1. A method of managing identity data discovered from network data traffic, comprising:
    representing identity data in an association of data object types, the data object types including a first type representing a source of an identity, a second type representing a time at which an identity appears in the network data traffic, and a third type representing an identity, wherein, for a given time period, an identity is represented only once in the hierarchical association;
    linking a particular identity in the hierarchical association with at least one other identity with which the particular identity shares a given relationship; and
    querying the hierarchical association to discover the given relationship.
    wherein each operation is carried out in software executing in a hardware element.

2. The method as described in claim 1 further including generating a graphical representation of the association of data object types.

3. The method as described in claim 2 wherein the graphical representation is a hierarchy comprising source data objects at a top level, time data objects at an intermediary level, and identity data objects at a lower level.

4. The method as described in claim 3 further including displaying the graphical representation as a visualization of one or more identity relationships.

5. The method as described in claim 1 wherein the at least one other identity is linked to the particular identity directly or indirectly.

6. The method as described in claim 1 wherein the querying operation is associated with a forensics incident analysis.

7. The method as described in claim 1 further including storing the association of data object types as a compact data structure within a distributed database.

8. Apparatus, comprising:
a processor;
computer memory holding computer program instructions executed by the processor to perform operations to manage identity data discovered from network data traffic by:
representing identity data in an association of data object types, the data object types including a first type representing a source of an identity, a second type representing a time at which an identity appears in the network data traffic, and a third type representing an identity, wherein, for a given time period, an identity is represented only once in the hierarchical association;
linking a particular identity in the hierarchical association with at least one other identity with which the particular identity shares a given relationship; and
querying the hierarchical association to discover the given relationship.

9. The apparatus as described in claim 8 wherein the operations further include generating a graphical representation of the association of data object types.

10. The apparatus as described in claim 9 wherein the graphical representation is a hierarchy comprising source data objects at a top level, time data objects at an intermediary level, and identity data objects at a lower level.

11. The apparatus as described in claim 10 wherein the operations further include displaying the graphical representation as a visualization of one or more identity relationships.

12. The apparatus as described in claim 8 wherein the at least one other identity is linked to the particular identity directly or indirectly.

13. The apparatus as described in claim 8 wherein the querying operation is associated with a forensics incident analysis.

14. The apparatus as described in claim 8 wherein the operations further include storing the association of data object types as a compact data structure within a distributed database.

15. A computer program product in a non-transitory computer readable medium for use in a data processing system, the computer program product holding computer program instructions which, when executed by the data processing system, perform a method of managing identity data discovered from network data traffic, comprising:
representing identity data in an association of data object types, the data object types including a first type representing a source of an identity, a second type representing a time at which an identity appears in the network data traffic, and a third type representing an identity, wherein, for a given time period, an identity is represented only once in the hierarchical association;
linking a particular identity in the hierarchical association with at least one other identity with which the particular identity shares a given relationship; and
querying the hierarchical association to discover the given relationship.
wherein each operation is carried out in software executing in a hardware element.

16. The computer program product as described in claim 15 wherein the method further includes generating a graphical representation of the association of data object types.

17. The computer program product as described in claim 16 wherein the graphical representation is a hierarchy comprising source data objects at a top level, time data objects at an intermediary level, and identity data objects at a lower level.

18. The computer program product as described in claim 17 wherein the method further includes displaying the graphical representation as a visualization of one or more identity relationships.

19. The computer program product as described in claim 15 wherein the at least one other identity is linked to the particular identity directly or indirectly.

20. The computer program product as described in claim 15 wherein the querying operation is associated with a forensics incident analysis.

21. The computer program product as described in claim 15 wherein the method further includes storing the association of data object types as a compact data structure within a distributed database.

* * * * *